(12) United States Patent
Muramatsu

(10) Patent No.: US 6,176,037 B1
(45) Date of Patent: Jan. 23, 2001

(54) AQUEOUS GEL MEDIUM FOR GROWING PLANT

(75) Inventor: Mitsuhide Muramatsu, Shizuoka (JP)

(73) Assignee: Yazaki Corporation, Tokyo (JP)

( * ) Notice: Under 35 U.S.C. 154(b), the term of this patent shall be extended for 0 days.

(21) Appl. No.: 08/926,981

(22) Filed: Sep. 10, 1997

(30) Foreign Application Priority Data

Sep. 11, 1996 (JP) .................................................. 8-240506

(51) Int. Cl.[7] .................................................. A01G 31/00
(52) U.S. Cl. .................................................. 47/64
(58) Field of Search .................. 47/63, 64, 59

(56) References Cited

U.S. PATENT DOCUMENTS

| | | |
|---|---|---|
| 1,446,113 | 2/1923 | Blackwell . |
| 3,467,609 | * 9/1969 | Adams et al. ............................ 47/64 |
| 3,835,584 | * 9/1974 | Shimazu ................ 47/41.11 |
| 3,973,355 | 8/1976 | McKenzie . |
| 4,196,543 | 4/1980 | Dedolph . |

FOREIGN PATENT DOCUMENTS

| | | | |
|---|---|---|---|
| 0 620 204 | 10/1994 | (EP) . | |
| 1473172 | 5/1977 | (GB) . | |
| 404267822 | * 9/1992 | (JP) | ......................................... 47/64 |
| 1752271 | * 8/1992 | (SU) | ......................................... 47/64 |

* cited by examiner

Primary Examiner—Michael J. Carone
Assistant Examiner—Joanne C. Downs
(74) Attorney, Agent, or Firm—Sughrue, Mion, Zinn, Macpeak & Seas,PLLC

(57) ABSTRACT

An aqueous gel medium for growing a plant which comprises an upper block and a lower block, wherein the lower block has a hole for growth of a root of the plant.

11 Claims, 2 Drawing Sheets

PRIOR ART
*FIG. 2 (a)*
PRIOR ART
*FIG. 2 (b)*
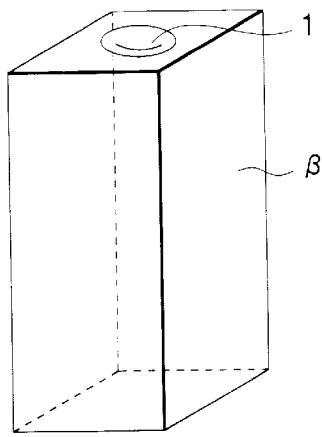
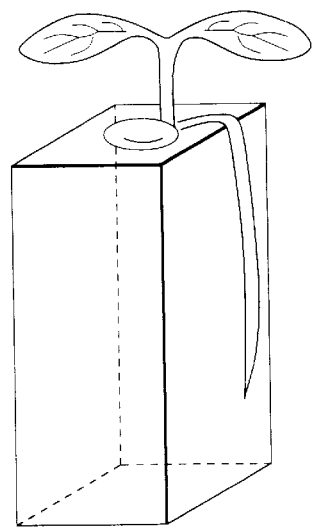
PRIOR ART
*FIG. 3 (a-1)*
PRIOR ART
*FIG. 3 (a-2)*
PRIOR ART
*FIG. 3 (b)*
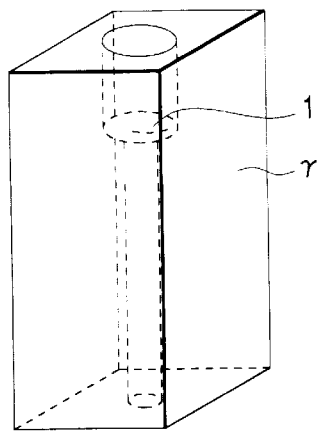
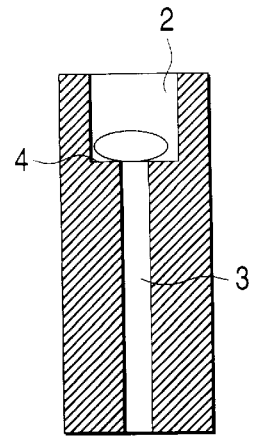
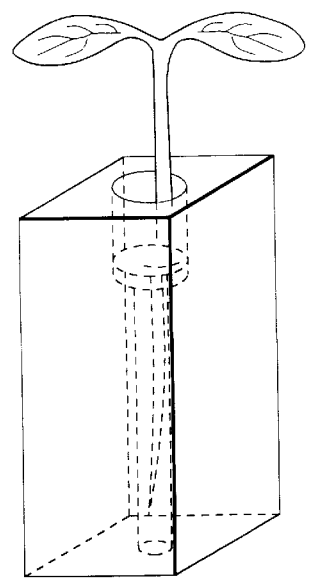

AQUEOUS GEL MEDIUM FOR GROWING PLANT

FIELD OF THE INVENTION

The present invention relates to an aqueous gel medium for growing a plant, on which a seed of the plant is put and which is then transplanted in the ground.

BACKGROUND OF THE INVENTION

Use of a medium as a seedbed for growing a plant, on which a seed of the plant is put and which is then transplanted in the ground, is effective in accelerating germination and preventing the plant from dying or being retarded in the initial stage of growth.

Such a medium for growing a plant includes known aqueous gel medium as disclosed in JP-A-63-71108 (the term "JP-A" as used herein means an "unexamined published Japanese patent application").

After a seed is planted on the known aqueous gel medium, the root grow through an aqueous gel, such as agar, while absorbing water of the gel.

However, since oxygen is supplied to the root growing deep in the aqueous gel only through diffusion from the gel surface into the inside of the gel, sufficient oxygen cannot be fed, and the growth of the plant is hindered. As a result, plants tend to die, or their initial growth tends to be extremely retarded.

Furthermore, cases often occur in which the root of the seed sown on aqueous gel medium β cannot enter the gel but creeps down the outer wall of the gel as shown in FIG. 2(b) (hereinafter referred to as "creeping down of the root"). If it happens, the aqueous gel is not made use of, resulting in growth insufficiency and the like.

Even those plants that have escaped such direct hindrances as mentioned above tend to fail to receive sufficient supply from the gel after being transplanted in the ground when the weather turns to slightly dry, often resulting in growth retardation or death.

Because of these serious drawbacks and little effect, seldom has the known aqueous gel medium been applied to practice use in growing a plant.

In order to overcome the drawbacks associated with the known aqueous gel medium for growing a plant, an aqueous gel medium for growing a plant shown in FIG. 3 as γ has been previously developed (hereinafter referred to as a "shelf-containing bored medium").

The shelf-containing bored medium γ has hole 3 for letting a root grow therethrough as shown in FIG. 3(b) and hole 2 for seeding the diameter of which is slightly larger than the diameter of a seed to be put therein as can be seen from the cross section of FIG. 3(a-2). A seed put into the hole 2 is held there by shelf 4 formed by the difference in diameter between the holes 2 and 3.

Although the shelf-containing bored medium γ solves the problems of the known aqueous gel medium having no hole, it necessitates preparing a variety of media different in diameter of the hole for seeding so as to cope with various kinds of plants. If a seed is put into a hole whose diameter is too large for the seed, the humidity of the atmosphere surrounding the seed would be insufficient for obtaining satisfactory results in terms of rate of germination or uniformity of the time of germination.

Accordingly, if seedlings of various kinds of plants are to be produced, as many shelf-containing bored media γ different in the diameter of the hole for seeding as the kinds of the plants must be stocked, which entails cost and requires a space. A stock of aqueous gel media should be stored with care not to dry or to prevent generation of mould because of its aqueous character. Therefore, it is disadvantageous to keep the stock of aqueous gel media.

SUMMARY OF THE INVENTION

An object of the present invention is to provide an aqueous gel medium for growing a plant on which the plant grows from a seed without being retarded or dying, which reduces the cost and space that might be necessary if several kinds of media different in the diameter of the hole for seeding are to be stocked.

This and other objects of the present invention have been accomplished by an aqueous gel medium for growing a plant comprising an upper block and a lower block, wherein the lower block has a hole for growth of a root of the plant (hereinafter often simply referred to as the "aqueous gel medium of the present invention").

BRIEF EXPLANATION OF THE DRAWINGS

FIGS. 1(a)–1(c) illustrate examples of the aqueous gel medium according to the present invention, in which FIG. 1(a) is a perspective view of aqueous gel medium α (separate type bored medium) separated into upper block α1 and lower block α2, FIG. 1(b) is a cross-sectional view of the aqueous gel medium α with seed 1 put thereon, and FIG. 1(c) is a perspective view illustrating the plant on the aqueous gel medium α after shooting.

FIGS. 2(a) and 2(b) illustrate known aqueous gel medium β for growing a plant, in which FIG. 2(a) is a perspective view of seeding, and FIG. 2(b) is a perspective view of the plant after shooting showing creeping down of the root.

FIGS. 3(a-1) 3(b) show examples of another known aqueous gel medium γ, in which FIG. 3(a-1) is a perspective view of seeding, FIG. 3(a-2) is a cross-sectional view of the medium γ with a plant seed put thereon, and FIG. 3(b) is a perspective view illustrating the plant on the medium γ after shooting.

In FIGS. 1–3, the numerals 1, 2, 3, and 4 represent a seed, a hole for seeding, a hole for growth of a root, and a shelf, respectively.

DETAILED DESCRIPTION OF THE INVENTION

Figure 1:
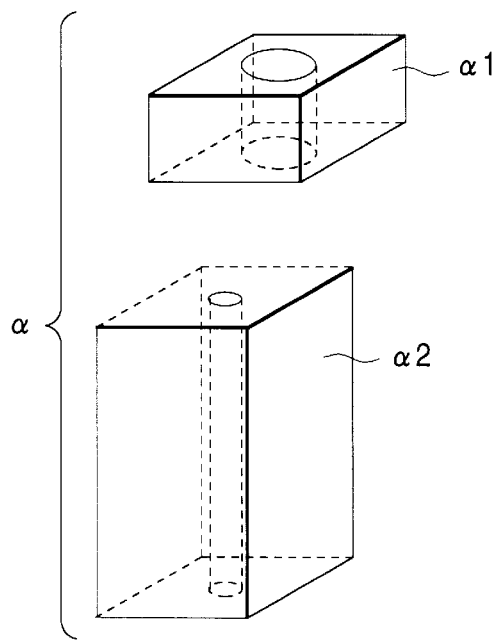
Figure 1:
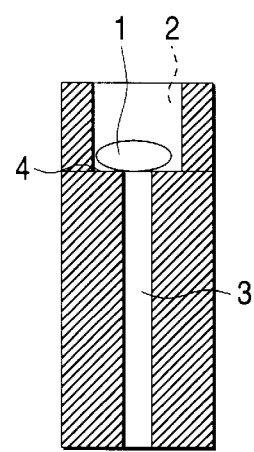
Figure 1:
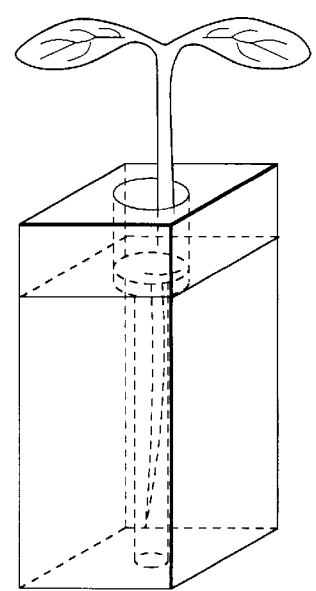

The upper block of the aqueous gel medium of the present invention can have a through-hole for seeding at least when used. The aqueous gel medium can be supplied to a user with its upper block non-bored. In this case, the user can bore a hole of adequate size on use, and there is no need for the user to keep an extra stock of the medium. Because the medium is formed by a soft aqueous gel, a hole can easily be made therethrough with a simple means, such as a cork borer.

Otherwise, a maker can supply the aqueous gel medium to a user with the upper block previously having a hole of adequate size at the demand of the individual user. That is, in the aqueous gel medium, the upper block has a hole for seeding having a size corresponding to the size of a seed of the plant to be sown.

Alternatively, a user may stock several kinds of upper blocks of different hole sizes, and one having an appropriate hole size is chosen and combined with a lower block on use. In this case, since it is only the upper block that the user should stock, the burden on the user side is small. This market system makes it feasible for the maker, on the other side, to produce the aqueous gel medium efficiently because the upper block or lower block can be produced in bulk by cutting an aqueous gel having a hole of appropriate size.

When an upper block and a lower block are combined into a medium, it is necessary that the hole for seeding and that for the growth of a root overlap at least partially. If a seed is as small as or smaller than the size of the hole for a root, the upper and lower blocks are set with the center of the hole of one of them being shifted from that of the hole of the other so as to make a sufficient shelf on which the small seed can be held and prevented from falling into the hole for a root. By this manipulation, a lower block having a fixed hole size can cope with a variety of plants.

Because the hole for a seed is made in the upper block, while the hole for a root in the lower block, the aqueous gel medium of the present invention is very easy to produce. That is, the blocks can be obtained simply by cutting a massive aqueous gel into blocks and boring the blocks. In the case of the above-described shelf-containing bored medium γ having an integral body with a shelf for holding a seed as shown in FIG. 3, on the other hand, it is difficult to form the shelf 4 by boring so that the medium of this type is actually produced by a less productive method, such as casting.

After a seed of a plant put in the hole for seeding of the upper block germinates, as far as the hole for a root pierces through the lower block in the direction which agrees with the direction of the growth of a primary root of the plant, air (oxygen) is fed to the root from both ends of the hole. Even though the primary root grows to clog the upper end of the hole, the other end (lower end) is still open and let oxygen be supplied to the root.

Besides being directly supplied to the primary root, oxygen diffuses from the inner wall of the hole for a root into the inside of the aqueous gel constituting the lower block and is delivered to secondary roots and root hairs.

Gel-forming agents which can be used to form the aqueous gel medium according to the present invention include sodium alginate, gellan gum, xantham gum, locust bean gum, carboxymethyl cellulose, pectin, gelatin, carrageenan, and agar. These gel-forming materials can be used alone or as a combination thereof.

Sodium alginate or pectin cannot gel before a crosslinking agent containing a crosslinking ion (e.g., Ca ion), such as calcium sulfate, is added to the gel-forming system. In order to control the action of the crosslinking agent, a sodium polyphosphate, e.g., sodium tripolyphosphate, can be added to the gel-forming system.

Carboxymethyl cellulose requires addition of a crosslinking agent, such as alum, for gelling.

It is a preferred embodiment of the present invention to incorporate a water-retaining agent, a fertilizer component or an antiseptic into the aqueous gel.

Addition of a water-retaining agent accelerates germination of even a seed taking a long time for germination and helps feed sufficient water to the seed, thus bringing about an improved rate of germination and an increased harvest.

Addition of a fertilizer component produces a fertilization effect. While any fertilizer components, either organic or inorganic, can be used as long as they contribute to the growth of a plant, those which interfere with gel formation or solidify or harden the gel to hinder the growth of a plant must be excluded.

Addition of an antiseptic is effective in preventing putrefaction of the aqueous gel. As a result, proliferation of bacteria detrimental to the growth of plants is controlled to prevent plant diseases.

As described above, the aqueous gel medium for growing a plant according to the present invention avoids the necessity of user's keeping a stock of a plurality of media different in the diameter of the hole for seeding, thereby reducing the burden of cost, space, etc. on a user. The aqueous gel medium of the present invention can easily be prepared. And yet it is free from the disadvantages associated with a non-bored aqueous gel medium, such that the root fails to grow within the medium and that sufficient oxygen cannot be supplied to the root, thereby protecting plants from growth retardation or death.

The present invention will now be illustrated in greater detail with reference to Examples in view of Comparative Examples, but it should be understood that the present invention is not construed as being limited thereto. Unless otherwise indicated, all percents are by weight.

EXAMPLES

Aqueous gel media for growing a plant in Examples and Comparative Examples were prepared as follows. Experimentation was conducted at room temperature (22 to 25° C.) unless otherwise indicated.

| Composition A: | |
| --- | --- |
| Gellan gum (gel-forming material) | 1% |
| Dextrin (water-retaining agent) | 4% |
| Calcium chloride (crosslinking agent) | 1% |
| Water | 94% |

Gellan gum and dextrin were added to water and dissolved therein by autoclaving at 120° C. for 15 minutes. Calcium chloride was added thereto, followed by stirring. The system was cooled spontaneously to room temperature to obtain an aqueous gel.

| Composition B: | |
| --- | --- |
| Xantham gum (gel-forming material) | 0.75% |
| Locust bean gum (gel-forming material) | 0.75% |
| Water | 98.5% |

Xantham gum and locust bean gum were dissolved in water by autoclaving at 120° C. for 15 minutes, followed by spontaneous cooling to room temperature to obtain an aqueous gel.

| Composition C: | |
| --- | --- |
| Gellan gum (gel-forming material) | 0.4% |
| Dextrin (water-retaining agent) | 1.6% |
| Xantham gum (gel-forming material) | 0.5% |
| Locust bean gum (gel-forming material) | 0.5% |
| Water | 97% |

Gellan gum, dextrin, xantham gum, and locust bean gum were dissolved in water by autoclaving at 120° C. for 15 minutes, followed by spontaneous cooling to room temperature to obtain an aqueous gel.

| Composition D: | |
|---|---|
| Agar (gel-forming material) | 1% |
| Water | 99% |

Agar was dissolved in water by autoclaving at 120° C. for 15 minutes, followed by spontaneous cooling to room temperature to obtain an aqueous gel.

Compositions E, F, and G:

The components shown in Table 1 below were mixed, stirred and dissolved to prepare an aqueous gel.

TABLE 1

| | Composition (wt %) | | |
|---|---|---|---|
| Component | E | F | G |
| Sodium alginate (gel-forming agent) | 2 | 2 | 2 |
| Calcium sulfate (crosslinking agent) | 2 | 1 | 1 |
| Sodium tripolyphosphate (sequestering agent) | 0.5 | 0.5 | 0.5 |
| Stone dust[1] | 6.5 | 6.5 | 6.5 |
| Water | 89.7 | 89.226 | 89.216 |
| MS medium[2] | — | 0.474 | 0.474 |
| Water-retaining agent[3] | 0.3 | 0.3 | 0.3 |
| Antiseptic[4] | — | — | 0.01 |

[1]Stone dust having a particle size of 100 to 250 mesh, used to facilitate stirring thereby to prevent non-uniform coagulation (formation of powdery lumps in the resulting gel).
[2]Murashige & Skoog medium, added as a fertilizer component.
[3]Grafted starch type superabsorbent polymer.
[4]Organic nitrogen/sulfur type antiseptic.

| Composition H: | |
|---|---|
| Carboxymethyl cellulose (gel-forming material) | 1.9% |
| Alum (crosslinking agent) | 0.1% |
| Water | 98% |

Carboxymethyl cellulose and alum were dissolved in water by stirring and coagulated to obtain an aqueous gel.

| Composition I: | |
|---|---|
| Pectin (gel-forming material) | 1% |
| Calcium chloride (crosslinking agent) | 0.025% |
| Sodium tripolyphosphate (sequestering agent) | 0.5% |
| Water | 98.475% |

Pectin, calcium chloride, and sodium tripolyphosphate were dissolved in water by stirring and coagulated to obtain an aqueous gel.

| Composition J: | |
|---|---|
| Gelatin (gel-forming agent) | 3% |
| Water | 97% |

Gelatin was dissolved in water by autoclaving at 120° C. for 15 minutes, followed by spontaneous cooling to room temperature to obtain an aqueous gel.

| Composition K: | |
|---|---|
| Carrageenan (gel-forming agent) | 1% |
| Potassium chloride (crosslinking agent) | 2% |
| Water | 97% |

Carrageenan and potassium chloride were dissolved in water by autoclaving at 120° C. for 15 minutes, followed by spontaneous cooling to room temperature to obtain an aqueous gel.

Examples 1 to 11 and Comparative Examples 1 to 22

An aqueous gel medium α for growing a plant comprising upper block α1 and lower block α2, the perspective view of each of which is shown in FIG. 1(a), (hereinafter referred to as a "separate type bored medium") was prepared from each of the aqueous gels having compositions A to K. Each aqueous gel was cut into blocks of 1.7 cm in width, 1.7 cm in length, and 0.5 cm in height to prepare upper blocks α1 and blocks of 1.7 cm in width, 1.7 cm in length, and 2.0 cm in height to obtain lower blocks α2. Hole 2 for seeding having a diameter of 5 mm was made throughout each upper block α1 from the top to the bottom, and hole 3 having a diameter of 3 mm, which was for the growth of a root, was made throughout each lower block α2. Because of the separate type, a large number of the bored media could be prepared easily simply by cutting and boring.

The upper block α1 was put on the lower block α2 with the centers of their respective holes in agreement with each other so that the difference in diameter between the two holes made ring shelf 4 as shown in FIG. 1(b). A seed of a sugar beet was put on the shelf 4, and the gel medium was planted in the ground (Examples 1 to 11).

Since the upper and lower blocks were in intimate contact with each other due to their own stickiness, the separate type bored medium were handled in the ordinary work of seeding and transplantation in the same manner as a known integral bored medium having a shelf.

For comparison, the aqueous gel having one of compositions A to K was cut into blocks of 1.7 cm in width, 1.7 cm in length and 2.5 cm in height to prepare an aqueous gel medium (hereinafter referred to as a "non-bored block") β. A sugar beet seed was put on the center of the upper side of each block β (see FIG. 2(a)), and the blocks were then planted in the ground (Comparative Examples 1 to 11).

Furthermore, the aqueous gel having one of compositions A to K was made into shelf-containing bored media γ designed for a seed of Japanese burdock. The shelf-containing medium γ for Japanese burdock was 1.7 cm in width, 1.7 cm in length and 2.5 cm in height in which the hole for seeding had a diameter of 9 mm and a depth of 0.5 mm (a depth to the shelf), and the hole for the growth of a root had a diameter of 3 mm. A sugar beet seed was put on each shelf-containing bored medium γ, and the media were planted in the ground (Comparative Examples 12 to 22).

Four hundred aqueous gel media of each Example and Comparative Example sown with a sugar beet and planted in the ground were let to grow, and the survival rate (the rate of surviving plants to germinated plants) was examined after 30 days and 45 days from the seeding. The results obtained are shown in Tables 2 to 4 below. The term "rate of piercing" in is the rate of plants whose primary root has entered the non-bored block β and grown within the block β to all the seeds sown as observed after 45 days from seeding. Similar observation was made on the plants grown on the bored media of Examples 1 to 11 and Comparative Examples 12 to 22. The primary root of all these plants was found to have been growing in the hole for the growth of a root as illustrated in FIG. 1(c) and FIG. 3(b).

TABLE 2

| Example No. | Rate of Germination (%) | Rate of Survival (%) | |
|---|---|---|---|
| | | After 30 Days | After 45 Days |
| 1 | 95 | 97 | 92 |
| 2 | 97 | 97 | 93 |
| 3 | 95 | 94 | 89 |
| 4 | 92 | 89 | 86 |
| 5 | 94 | 96 | 93 |
| 6 | 93 | 94 | 90 |
| 7 | 96 | 93 | 88 |
| 8 | 97 | 92 | 91 |
| 9 | 96 | 93 | 89 |
| 10 | 92 | 94 | 90 |
| 11 | 95 | 93 | 91 |

TABLE 3

| Compara. Example No. | Rate of Germination (%) | Rate of Survival (%) | | Rate of Piercing (%) |
|---|---|---|---|---|
| | | After 30 Days | After 45 Days | |
| 1 | 93 | 94 | 85 | 11 |
| 2 | 89 | 87 | 81 | 9 |
| 3 | 91 | 88 | 80 | 14 |
| 4 | 89 | 63 | 44 | 42 |
| 5 | 94 | 91 | 84 | 10 |
| 6 | 95 | 95 | 85 | 13 |
| 7 | 96 | 95 | 89 | 12 |
| 8 | 93 | 93 | 90 | 9 |
| 9 | 92 | 90 | 85 | 10 |
| 10 | 92 | 92 | 88 | 12 |
| 11 | 94 | 94 | 81 | 11 |

TABLE 4

| Comparative Example No. | Rate of Germination (%) | Rate of Survival (%) | |
|---|---|---|---|
| | | After 30 Days | After 45 Days |
| 12 | 94 | 93 | 89 |
| 13 | 92 | 89 | 86 |
| 14 | 91 | 89 | 84 |
| 15 | 90 | 79 | 72 |
| 16 | 93 | 92 | 87 |
| 17 | 95 | 95 | 88 |
| 18 | 94 | 96 | 91 |
| 19 | 93 | 94 | 87 |
| 20 | 93 | 92 | 85 |
| 21 | 94 | 93 | 83 |
| 22 | 93 | 95 | 91 |

It is seen from Tables 2 through 4, the plants grown on the separate type bored medium according to the present invention exhibit a high rate of germination and a high rate of survival. The plants of Comparative Examples 12 to 22 are inferior to those of Examples 1 to 11 in rate of germination and rate of survival probably because the diameter of the hole for seeding of the shelf-containing bored medium γ used in Comparative Examples 12 to 22 is not fit for a sugar beat seed.

Examples 12 to 29 and Comparative Examples 23 to 34

While use of a medium designed to a different kind of seeds seems to cause inferior results as shown in Comparative Examples 12 to 22, the size of a seed varies not only among different kinds but among individuals of the same kind. From this point of view, the size distribution of commercially available spinach seeds was examined by classifying into three groups with a 3 mm mesh sieve and a 5 mm mesh sieve. That is, the number of seeds that passed through a 3 mm mesh sieve (hereinafter referred to as "small seeds"), the number of seeds that passed through a 5 mm mesh sieve and did not pass through a 3 mm mesh sieve (hereinafter referred to as "medium seeds"), and the number of seeds that did not pass through a 5 mm mesh sieve (hereinafter referred to as "large seeds") were counted to obtain the results of Table 5.

TABLE 5

| Small Seeds | Medium Seeds | Large Seeds |
|---|---|---|
| 6126 | 18074 | 5921 |

It was confirmed that seeds of the same kind considerably vary in size. It is rare for seed markers to sell their seeds with a regulated size.

The aqueous gel medium according to the present invention easily copes with seeds having such a broad size distribution. In order to demonstrate this, the following experiments were carried out.

The spinach seeds classified as shown in Table 5 were each put on a separate type bored medium of the present invention whose hole for seeding had a diameter of 3 mm, 5 mm or 7 mm. The media sown with the seed (400 seeds for each medium) were put in a seedling box, covered with a wet paper, and allowed to stand for 24 hours. Then the media were set out in the field (volcanic ash soil) cultivated with a rotary cultivator at 40 mm intervals between plants, covered with soil to a thickness of 5 mm, and lightly pressed by the hand (Oct. 2, 1995). In order to see the uniformity of the time of germination, the rate of germination (shooting above the ground) was examined after 3 days, 5 days, and 7 days from the seeding for each group consisting of 400 seeds. After 15 days and 30 days from seeding, the rate of growth into seedlings was also examined for each group. The results obtained are shown in Table 6 below.

For comparison, the same experiments were carried out using the non-bored block β (Comparative Examples 23 to 31) on the same day. Furthermore, 400 spinach seeds per size were sown directly in the ground on the same day (Comparative Examples 32 to 34). The rate of germination and the rate of growth into seedlings in these Comparative Examples are shown in Table 7 below.

TABLE 6

| Example No. | Seed Size | Aqueous Gel Composition | Diameter of Holes (mm) for Seed | Diameter of Holes (mm) for Root | Rate of Germination (%) 3 Days | Rate of Germination (%) 5 Days | Rate of Germination (%) 7 Days | Rate of Growth to Seedling (%) 15 Days | Rate of Growth to Seedling (%) 30 Days |
|---|---|---|---|---|---|---|---|---|---|
| 1 | small | B | 3 | 2 | 33 | 74 | 82 | 94 | 91 |
| 2 | | | 5 | | 30 | 64 | 78 | 83 | 80 |
| 3 | | | 7 | | 26 | 64 | 75 | 81 | 75 |
| 4 | medium | | 5 | | 35 | 78 | 86 | 93 | 93 |
| 5 | | | 7 | | 28 | 68 | 79 | 90 | 85 |
| 6 | large | | 7 | | 34 | 77 | 88 | 92 | 93 |
| 7 | small | G | 3 | | 38 | 77 | 81 | 92 | 90 |
| 8 | | | 5 | | 32 | 72 | 80 | 87 | 83 |
| 9 | | | 7 | | 27 | 69 | 78 | 88 | 82 |
| 10 | medium | | 5 | | 40 | 82 | 89 | 92 | 94 |
| 11 | | | 7 | | 34 | 76 | 83 | 90 | 87 |
| 12 | large | | 7 | | 38 | 82 | 92 | 94 | 91 |
| 13 | small | I | 3 | | 32 | 72 | 79 | 91 | 91 |
| 14 | | | 5 | | 28 | 67 | 79 | 87 | 83 |
| 15 | | | 7 | | 24 | 66 | 74 | 85 | 77 |
| 16 | medium | | 5 | | 33 | 78 | 83 | 89 | 90 |
| 17 | | | 7 | | 38 | 81 | 88 | 84 | 71 |
| 18 | large | | 7 | | 41 | 85 | 88 | 93 | 93 |

TABLE 7

| Compara. Example No. | Seed Size | Seeding Conditions | Rate of Germination (%) 3 Days | Rate of Germination (%) 5 Days | Rate of Germination (%) 7 Days | Rate of Growth to Seedling (%) 15 Days | Rate of Growth to Seedling (%) 30 Days |
|---|---|---|---|---|---|---|---|
| 23 | small | seeding on non- | 27 | 63 | 73 | 79 | 70 |
| 24 | medium | bored aqueous gel | 29 | 68 | 75 | 81 | 76 |
| 25 | large | medium having composition B | 28 | 68 | 76 | 82 | 78 |
| 26 | small | seeding on non- | 29 | 67 | 78 | 82 | 76 |
| 27 | medium | bored aqueous gel | 31 | 70 | 81 | 85 | 77 |
| 28 | large | medium having composition G | 35 | 72 | 85 | 88 | 77 |
| 29 | small | seeding on non- | 27 | 62 | 75 | 80 | 72 |
| 30 | medium | bored aqueous gel | 29 | 67 | 78 | 82 | 75 |
| 31 | large | medium having composition I | 31 | 71 | 80 | 82 | 77 |
| 32 | small | seeding directly | 6 | 32 | 43 | 82 | 91 |
| 33 | medium | in the ground | 8 | 35 | 54 | 88 | 91 |
| 34 | large | | 9 | 36 | 51 | 91 | 93 |

It can be seen from Tables 6 and 7 that the use of an aqueous gel medium achieves higher rates of survival than seeding directly in the ground and that the bored aqueous gel media attain still higher rates of survival than the non-bored aqueous gel media. The results in Table 6 also reveal that better results in terms of uniformity in the time of germination and rate of germination can be obtained by using a an upper block having a hole for seeding whose diameter is the closest to the size of the seed.

From the foregoing experiments it would be understood that the aqueous gel medium according to the present invention is of great importance because of the ease in making a hole having an adequate diameter for seeding.

While the invention has been described in detail and with reference to specific examples thereof, it will be apparent to one skilled in the art that various changes and modifications can be made therein without departing from the spirit and scope thereof.

This application is based on application No. Hei 8-240506 filed in Japan, the entire content of which is incorporated hereinto by reference.

What is claimed is:

1. A support medium for growing a plant, comprising an upper block and a lower block, both of aqueous gel medium, the upper block positioned over the lower block, the upper block having a seed hole through the upper block for insertion of a seed of the plant, the lower block having a root hole through the lower block for growth of a root of the plant the lower block providing means adapted to support a seed placed in the seed hole of the upper block.

2. The support medium according to claim 1, wherein the root hole for growth of a root pierces through the lower block in correspondence with the direction of the growth of the primary root of the plant.

3. The support medium according to claim 1, wherein the upper block has a seed hole for seeding having a size corresponding to the size of a seed of the plant to be sown.

4. The support medium according to claim 1, wherein said means adapted to support is an offset of the seed hole and the root hole.

5. The support medium according to claim 1, wherein each said aqueous gel medium is formed by at least one of sodium alginate, gellan gum, xanthan gum, locust bean gum, carboxymethyl cellulose, pectin, gelatin, carrageenan, and agar.

6. The support medium according to claim 1, which further comprises a water-retaining agent.

7. The support medium according to claim 1, which further comprises a fertilizer component.

8. The support medium according to claim 1, further comprising an antiseptic.

9. The support medium according to claim 1, wherein the means adapted to support is provided by the seed hole having a diameter larger than a diameter of the root hole.

10. The support medium according to claim 1, wherein the root hole has a diameter of 3 mm.

11. The support medium according to claim 1, wherein the seed hole has a diameter of from 3–9 mm.

* * * * *